(12) United States Patent
Chen

(10) Patent No.: US 8,588,723 B2
(45) Date of Patent: Nov. 19, 2013

(54) GENERAL RECEIVER DEVICE WITH ADAPTIVE FILTER

(75) Inventor: Chun-Liang Chen, Tainan (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 0 days.

(21) Appl. No.: 13/414,905

(22) Filed: Mar. 8, 2012

(65) Prior Publication Data

US 2012/0295564 A1    Nov. 22, 2012

(30) Foreign Application Priority Data

May 20, 2011    (TW) .............................. 100117703 A

(51) Int. Cl.
*H04B 1/10* (2006.01)
(52) U.S. Cl.
USPC ......................................... 455/307; 307/497
(58) Field of Classification Search
USPC ...................... 455/307, 306, 339, 226.1, 255; 370/290, 291, 497
See application file for complete search history.

(56) References Cited

U.S. PATENT DOCUMENTS

| | | | |
|---|---|---|---|
| 8,013,651 B2 * | 9/2011 | Lee et al. ...................... | 327/231 |
| 2010/0148849 A1 * | 6/2010 | Lee et al. ...................... | 327/416 |
| 2010/0329158 A1 * | 12/2010 | Sengupta et al. ............. | 370/278 |

* cited by examiner

*Primary Examiner* — Sonny Trinh
(74) *Attorney, Agent, or Firm* — Bacon & Thomas, PLLC

(57) ABSTRACT

A general receiver device with adaptive filter includes an antenna, a low noise amplifier, a bandpass tracking filter, a single-ended-to-differential converter unit, a mixer, and an adaptive filter. The antenna receives an RF signal. The low noise amplifier amplifies the RF signal for generating an amplified RF signal. The band-pass tracking filter filters the amplified RF signal for generating a filtered RF signal. The single-ended-to-differential converter unit converts the filtered RF signal into a differential RF signal. The mixer receives a differential local oscillation signal and uses the differential local oscillation signal to down-convert the differential RF signal into a differential IF signal. The adaptive filter filters the differential IF signal for generating a filtered differential IF signal.

15 Claims, 12 Drawing Sheets

GENERAL RECEIVER DEVICE WITH ADAPTIVE FILTER

CROSS REFERENCE TO RELATED APPLICATION

This application claims the benefits of the Taiwan Patent Application Serial Number 100117703, filed on May 20, 2011, the subject matter of which is incorporated herein by reference.

BACKGROUND OF THE INVENTION

1. Field of the Invention

The present invention relates to a wireless receiver device and, more particularly, to a general receiver device with adaptive filter.

2. Description of Related Art

Typical receiver architectures can be divided into a single conversion with intermediate frequency (IF), a single conversion with low IF, a single conversion with zero IF, a dual conversion with IF, a dual conversion with low IF, and a dual conversion with zero IF. In the architectures of the single conversion with IF, the dual conversion with IF, and the dual conversion with low IF, an IF filter performs the frequency selection and filtering function. A surface acoustic wave (SAW) filter has the advantages of high quality factor (Q factor), low frequency offset, and low power consumption, but the SAW filter requires a special process and is difficult in integration into a single chip. Thus, a receiver is typically connected with an external SAW filter.

FIG. 1 schematically illustrates a typical tuner with a SAW filter, which converts a radio frequency (RF) signal into an intermediate frequency (IF) signal. The SAW filter 110 is disposed outside the tuner 120. Typically, a SAW filter has very high Q factor and better frequency selectivity, but a higher price makes the entire cost of a tuner significantly high. Also, the input impedance of a SAW filter is typically designed to be 50 ohms, so that the SAW filter driver 121 requires hundreds of mW in power consumption for driving the low impedance SAW filter externally connected. Further, the SAW filter itself has very high signal loss, which indicates a reduction in signal to noise ratio (SNR).

For replacing the SAW filter and integrating it into a single chip, a filter can be designed as various types such as a resistor-capacitor filter (RC filter), a switch-capacitor filter (SC filter), and a transconductor-capacitor filter (Gm-C filter).

The RC filter is applied only for a KHz-order filter in KHz due to the limited bandwidth of operational amplifier, and not suitable for an IF operation. For the SC filter, the parameters are set based on the capacitance ratio. In a CMOS process, the capacitance ratio can be controlled accurately. In this case, the SC filter can use the capacitance ratio to determine the filter characteristic without being easily affected by the process, but it is not suitable for a filter over 10 MHz due to the high power consumption and the bandwidth of operational amplifier.

The Gm-C filter uses one or more transconductance amplifiers and/or capacitors to simulate a resistive and inductive effect. FIG. 2 schematically illustrates a transconductance amplifier simulating the resistive effect in the prior art, where the simulated resistance is $$\frac{1}{G_m},$$

for Gm indicates the transconductance of the transconductance amplifier 210. FIG. 3 schematically illustrates two transconductance amplifiers and one capacitor which simulate the inductive effect in the prior art, where the simulated inductance is $$\frac{C}{G_1 \times G_2},$$

for C indicates the capacitance of the capacitor 310, G1 indicates the transconductance of the transconductance amplifier 320, and G2 indicates the transconductance of the transconductance amplifier 330.

For designing a Gm-C filter, the circuit of resistor-inductor-capacitor (RLC) filter has to be designed first. FIG. 4 shows a circuit of a typical RLC filter. In FIG. 4, the resistors can be replaced with the circuit of FIG. 2 while the inductors can be replaced with the circuit of FIG. 3. Therefore, when the Gm-C filters are used to design an IF filter, it is likely to cause the problem that the circuit area is too large. In addition, the coefficients of the Gm-C filters are typically a product of two different components. For example, as cited above, the simulated inductance is obtained by dividing the capacitance of the capacitor 310 by a product of the transconductance of the transconductance amplifiers 320, 330. Further, the error rate for the coefficients of an SC filter is as low as 0.1%, but the error rate for the coefficients of a Gm-C filter in the initial stage is as high as 30%.

As cited, the tuner in FIG. 1 has the disadvantages of over-high cost and complicated integration due to the use of SAW filter. When the Gm-C filter is used in the tuner for replacing the SAW filter, it has the disadvantages of over-large area and over-high cost. In addition, in many wireless receiver applications, such as a terrestrial digital video broadcasting (DVB-T), the central frequencies and the bandwidths are different. Unfortunately, with either the SAW or Gm-C filter, the central frequency of the tuner is fixed and thus cannot be adjusted according to the applications. Therefore, it is desirable to provide an improved receiver device to mitigate and/or obviate the aforementioned problems.

SUMMARY OF THE INVENTION

The object of the present invention is to provide a general receiver device with adaptive filter, which has no SAW filter to thereby save the cost and which can be integrated into a single chip. Further, the general receiver device with adaptive filter can be applied with different wireless receiver requirements so as to provide an excellent cost-performance ratio.

In one aspect of the invention, there is provided a general receiver device with adaptive filter, which includes: an antenna for receiving a radio frequency signal with a plurality of bands, each band having a plurality of channels; a low noise amplifier connected to the antenna for amplifying the radio frequency signal so as to generate an amplified radio frequency signal; a bandpass tracking filter connected to the low noise amplifier for filtering the amplified radio frequency signal so as to generate a filtered radio frequency signal; a single-ended-to-differential converter unit connected to the bandpass tracking filter for converting the filtered radio frequency signal into a differential radio frequency signal; a mixer connected to the single-ended-to-differential converter unit for receiving a differential local oscillation signal so as to generate a differential intermediate frequency signal; and an adaptive filter connected to the mixer for filtering the differential intermediate frequency signal so as to generate a filtered differential intermediate frequency signal.

In another aspect of the invention, there is provided a general receiver device with adaptive filter, which includes: an antenna for receiving a radio frequency signal with a plurality of bands, each band having a plurality of channels; a low noise amplifier connected to the antenna for amplifying the radio frequency signal so as to generate an amplified radio frequency signal; a bandpass tracking filter connected to the low noise amplifier for filtering the amplified radio frequency signal so as to generate a filtered radio frequency signal; a single-ended-to-differential converter unit connected to the bandpass tracking filter for converting the filtered radio frequency signal into a differential radio frequency signal; a first mixer connected to the single-ended-to-differential converter unit for receiving a first differential local oscillation signal so as to generate a first differential intermediate frequency signal; a first adaptive filter connected to the first mixer for filtering the first differential intermediate frequency signal so as to generate a first filtered differential intermediate frequency signal; a second mixer connected to the first adaptive filter for receiving a second differential local oscillation signal so as to generate a second differential intermediate frequency signal; a second adaptive filter connected to the second mixer for filtering the second differential intermediate frequency signal so as to generate a second filtered differential intermediate frequency signal; a filtered intermediate frequency automatic gain control amplifier connected to the second adaptive filter for amplifying the second filtered differential intermediate frequency signal so as to generate an amplified differential intermediate frequency signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
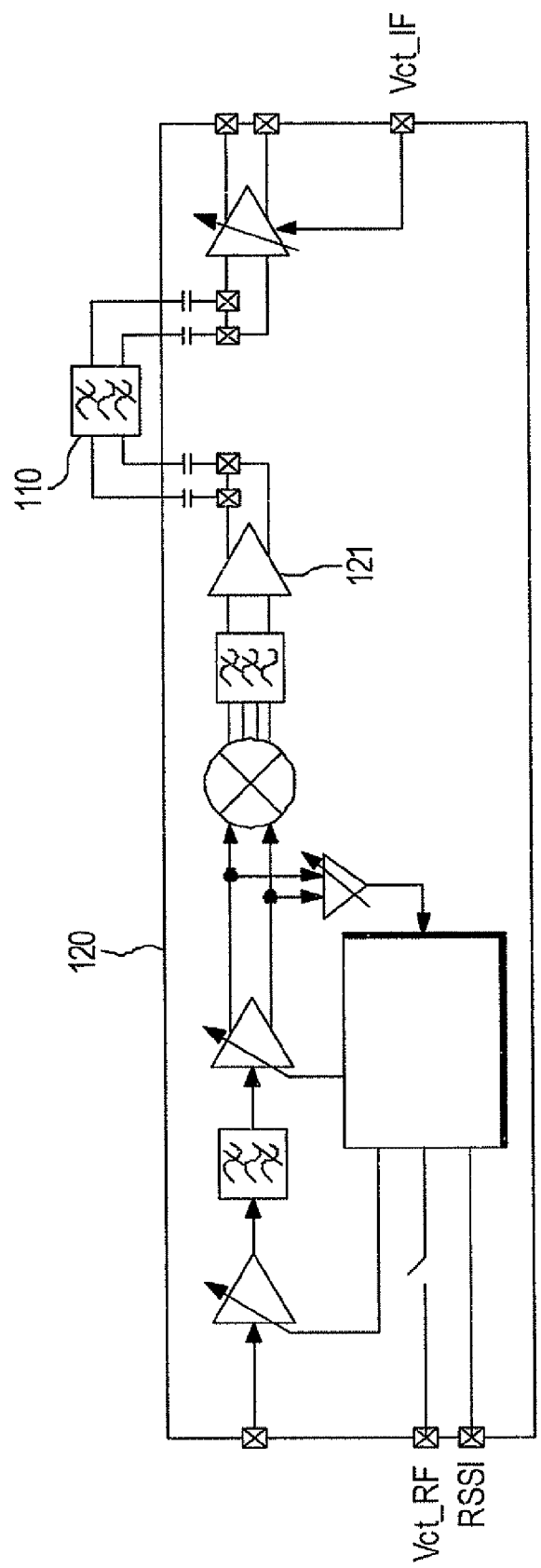
FIG. 1 schematically illustrates a typical tuner with a SAW filter.
Figure 2:
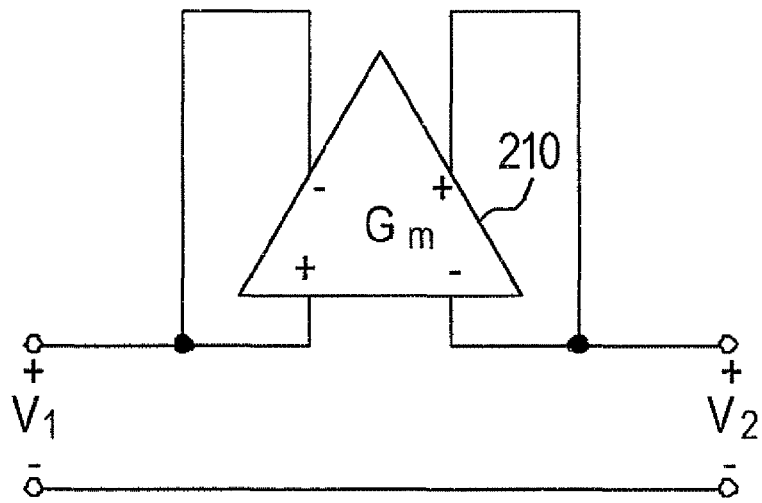
FIG. 2 schematically illustrates a transconductance amplifier simulating a resistive effect in the prior art.
Figure 3:
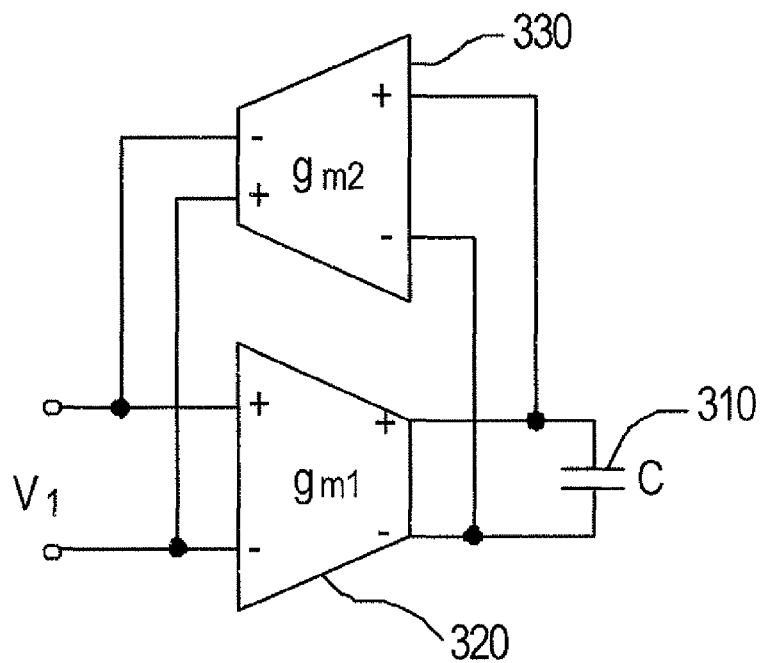
FIG. 3 schematically illustrates two transconductance amplifiers and one capacitor which simulate an inductive effect in the prior art.
Figure 4:
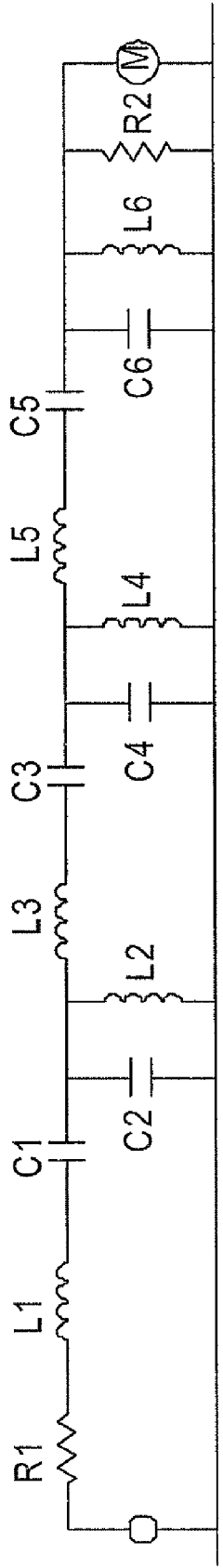
FIG. 4 is a circuit diagram of a typical RLC filter.
Figure 5:
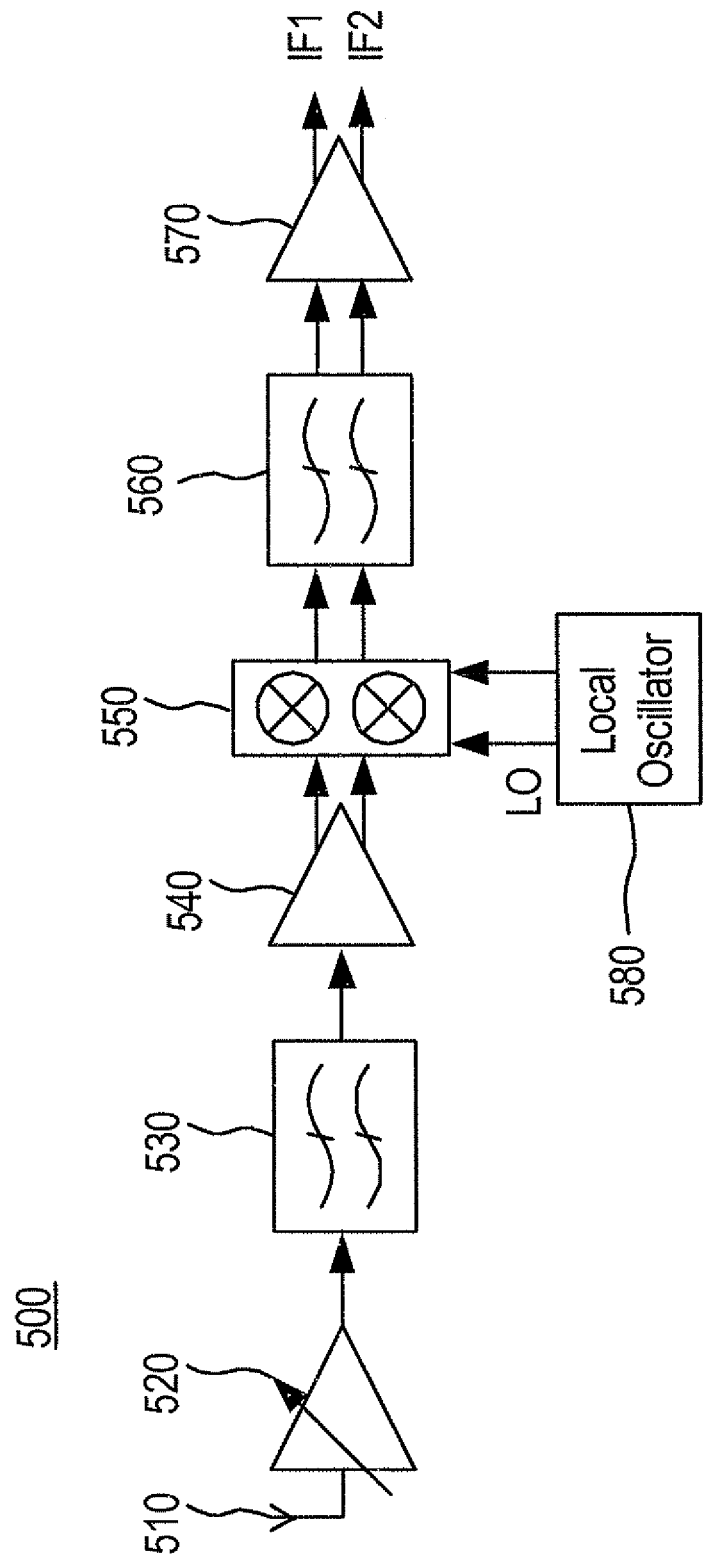
FIG. 5 is a block diagram of a general receiver device with adaptive filter according to an embodiment of the invention.

FIG. 5 is a block diagram of a general receiver device 500 with adaptive filter according to an embodiment of the invention. In FIG. 5, the device 500 includes an antenna 510, a bandpass tracking filter 530, a low noise amplifier (LNA) 520, a single-ended-to-differential converter unit 540, a mixer 550, an adaptive filter 560, a filtered intermediate frequency automatic gain control (IF AGC) amplifier 570, and a local oscillator 580.

The antenna 510 receives a radio frequency (RF) signal. The RF signal has a plurality of bands, each band having a plurality of channels.

The low noise amplifier 520 is connected to the antenna 510 in order to amplify the radio frequency signal for generating an amplified radio frequency signal.

Figure 6:
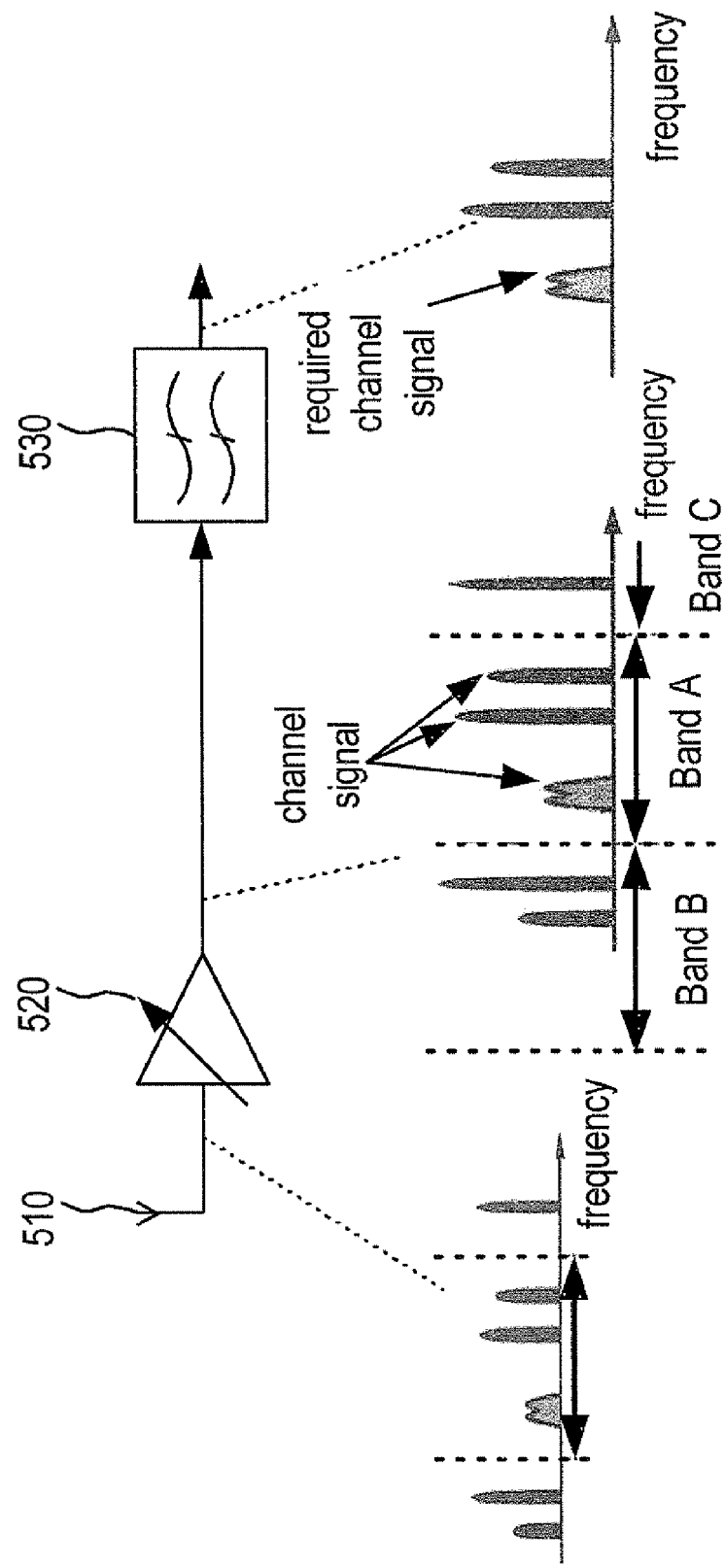
FIG. 6 schematically illustrates spectrum of a radio frequency signal and a filtered radio frequency signal according to an embodiment of the invention.

The bandpass tracking filter 530 is connected to the low noise amplifier 520 in order to filter the amplified radio frequency signal for generating a filtered radio frequency signal. The bandpass tracking filter 530 is a band selective filter. The filtered radio frequency signal only contains signals of a plurality of channels in a specific band. The central frequency of the specific band is equal to that of the bandpass tracking filter. FIG. 6 schematically illustrates spectrums of a radio frequency signal and a filtered radio frequency signal according to an embodiment of the invention. As shown in FIG. 6, the bandpass tracking filter 530 allows signals of the plurality of channels in Band A to pass through and filters out signals in other bands (Band B, Band C). Namely, the bandpass tracking filter 530 filters out the mirroring signals in order to avoid damaging the required signals of the channels when overlapping the mirroring signals after the mixer 550.

The single-ended-to-differential converter unit 540 is connected to the bandpass tracking filter 530 in order to convert the filtered radio frequency signal into a differential radio frequency signal. The single-ended-to-differential converter unit 540 generates the differential radio frequency signal for allowing subsequent processing units to process signals in a differential manner, so as to reject a common noise, a substrate noise of a subsequent digital circuit, or a noise caused by a clock of a subsequent digital circuit.

The mixer 550 is connected to the single-ended-to-differential converter unit 540 in order to receive a differential local oscillation signal (LO) for generating a differential intermediate frequency signal. The mixer 550 down-converts the differential RF signal to an IF band by mixing with the differential local oscillation signal with a frequency higher than that of the IF.

The adaptive filter 560 is connected to the mixer 550 in order to filter the differential intermediate frequency (IF) signal for generating a filtered differential intermediate frequency signal. The adaptive filter 560 is a channel selective filter. The filtered differential IF signal is a required channel signal in the specific band. The adaptive filter 560 allows the required channel signal to pass through and filters out the other channel signals.

The filtered IF AGC amplifier 570 is connected to the adaptive filter 560 in order to amplify the filtered differential IF signal for generating an amplified filtered differential IF signal (IF1, IF2) to subsequent processing units, such as a demodulator, for further processing.

The local oscillator 580 is connected to the mixer 550 in order to generate the differential local oscillation signal.

The general receiver device 500 uses the bandpass tracking filter 530 to eliminate the mirroring signals, uses the mixer 550 to mix the differential RF signal with the differential local oscillation signal for producing the differential IF signal, and uses the adaptive filter 560 to select the required channel signal and filter out the unwanted channel signals.

Figure 7:
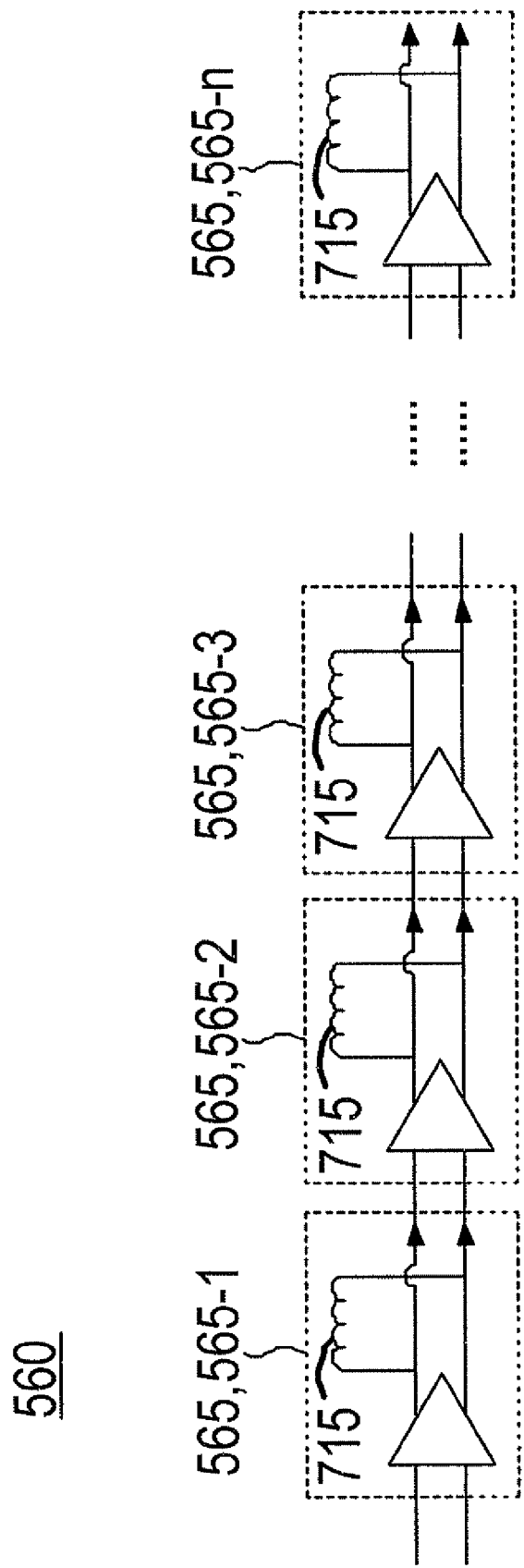
FIG. 7 is a circuit diagram of an adaptive filter according to an embodiment of the invention.

FIG. 7 is a circuit diagram of the adaptive filter 560 according to an embodiment of the invention. The adaptive filter 560 is applied in a wireless receiver device. The adaptive filter 560 is formed by connecting an odd or even number of filters 565 in series. For example, three, four, or even seven filters 565 are connected in series to form the adaptive filter 560. For convenient description, this embodiment is given by three filters 565 connected in series as an example, but not limited to it. The other number of filters connected in series can be embodied by those skilled in the art.

The adaptive filter 560 includes a first filter 565-1, a second filter 565-2, and a third filter 565-3.

The first filter 565-1 has a first quality factor Q1 with a relative low value to define the bandwidth and central frequency of the adaptive filter 560. The second filter 565-2 is connected to the first filter 565-1 and has a second quality factor Q2 with a relative high value. The spectrums of the first and second filters 565-1, 565-2 define a lower bound frequency and sharpness of the bandwidth of the adaptive filter 560. The third filter 565-3 is connected to the second filter 565-2 and has a third quality factor Q3 with a relative high value. The spectrums of the first and third filters 565-1, 565-3 define an upper bound frequency $f_H$ and sharpness of the bandwidth of the adaptive filter 560. The first quality factor Q1 has a value in a range of 5 to 15, and the second quality factor Q2 and the third quality factor Q3 each have a value over 15.

Figure 8:
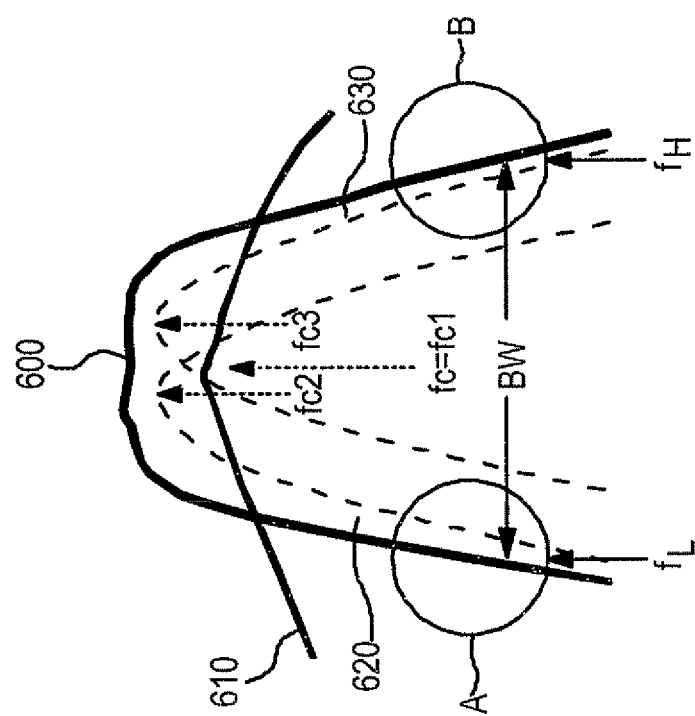
FIG. 8 schematically illustrates spectrums of an adaptive filter, and the first, the second, and the third filters according to an embodiment of the invention.

FIG. 8 schematically illustrates the spectrums of the adaptive filter 560, the first filter 565-1, the second filter 565-2, and the third filter 565-3 according to an embodiment of the invention. As shown in FIG. 8, line 610 indicates the spectrum of the first filter 565-1, which has a larger bandwidth due to a lower value, about 5-15, of the first quality factor Q1. Since the first filter 565-1 is designed symmetrically, the central frequency fc1 of the first filter 565-1 can be used as the central frequency fc of the adaptive filter 560.

Line 620 indicates the spectrum of the second filter 565-2, and line 630 indicates the spectrum of the third filter 565-3. Line 600 indicates the spectrum of the adaptive filter 560. The central frequency Fc2 of the second filter 2 is smaller than the central frequency fc1 of the first filter 565-1, and the central frequency fc1 of the first filter 565-1 is smaller than the central frequency fc2 of the third filter 565-3. Since the second quality factor Q2 and the third quality factor Q3 each have a value over 15, the bandwidths are smaller with respect to that of the first filter 565-1.

As shown in FIG. 8, the spectrums of the first and second filters 565-1, 565-2 define a lower bound frequency $f_L$ and sharpness of the bandwidth of the adaptive filter 560, as denoted by circle A. Similarly, the spectrums of the first and third filters 565-1, 565-3 define an upper bound frequency $f_H$ and sharpness of the bandwidth of the adaptive filter 560, as denoted by circle B of FIG. 8.

Figure 9:
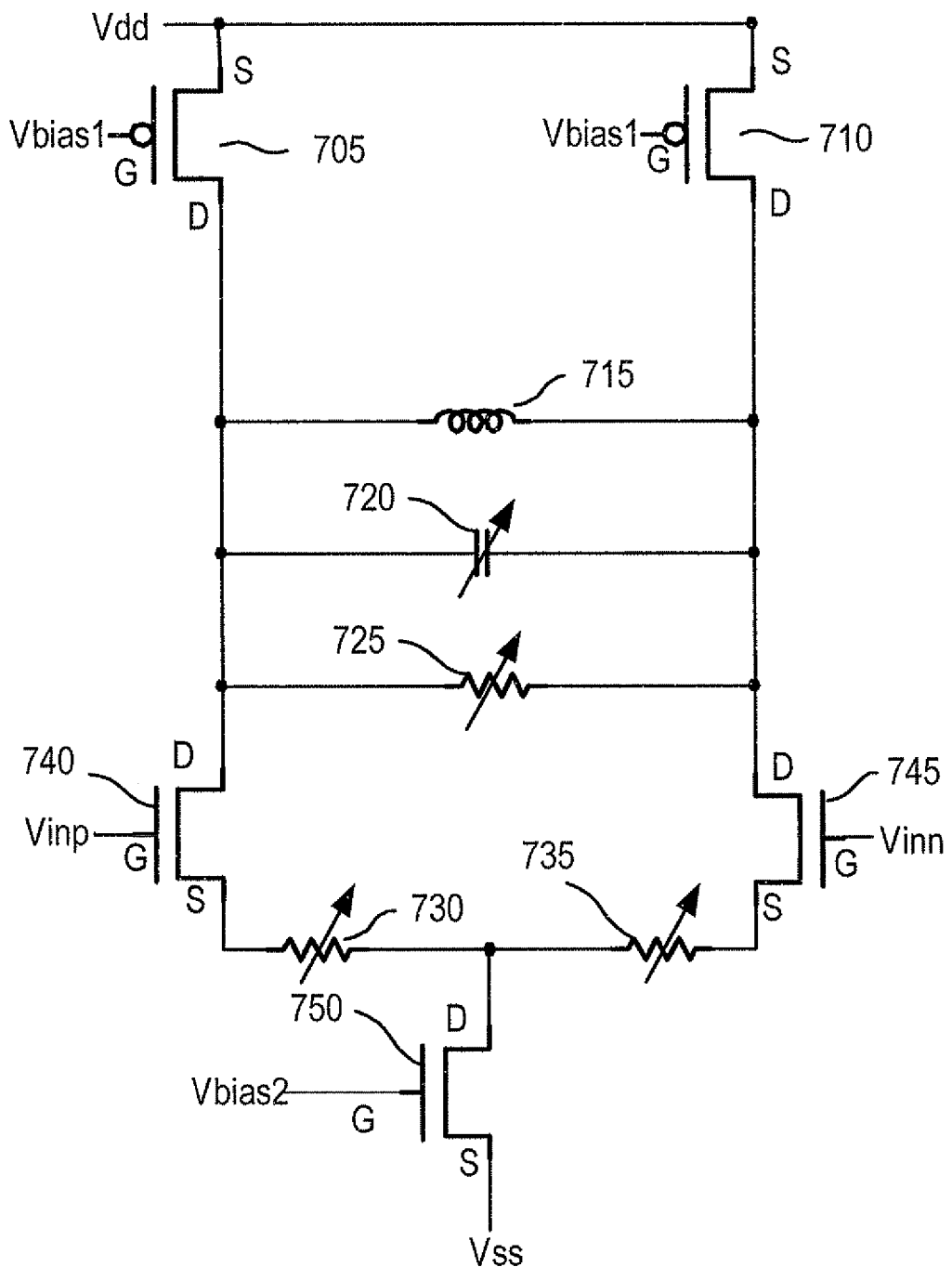
FIG. 9 is a circuit diagram of each of the first, the second, and the third filters according to an embodiment of the invention.

FIG. 9 is a circuit diagram of each of the first, the second, and the third filters 565-1, 565-2, and 565-3 according to an embodiment of the invention. It is known from FIG. 9 that the central frequencies and gains of the first, the second, and the third filters 565-1, 565-2, and 565-3 are adjustable.

As shown in FIG. 9, each of the first, the second, and the third filters 565-1, 565-2, and 565-3 is comprised of a first PMOS transistor 705, a second PMOS transistor 710, a first inductor 715, a first variable capacitor 720, a first variable resistor 725, a second variable resistor 730, a third variable resistor 735, a first NMOS transistor 740, a second NMOS transistor 745, and a third NMOS transistor 750.

For each of the first filter 565-1, the second filter 565-2, and the third filter 565-3, the sources of the first and the second PMOS transistors 705 and 710 are connected to a high voltage Vdd. The gates of the first and the second PMOS transistors 705 and 710 are connected to a first bias voltage Vbias1.

The drain of the first PMOS transistor 705 is connected to one end of the first inductor 715, one end of the first variable capacitor 720, one end of the first variable resistor 725, and a drain of the first NMOS transistor 740. The drain of the second PMOS transistor 710 is connected to the other end of the first inductor 715, the other end of the first variable capacitor 720, the other end of the first variable resistor 725, and a drain of the second NMOS transistor 745.

The gates of the first and the second NMOS transistors 740 and 745 receive a differential voltage (Vinp, Vinn). The source of the first NMOS transistor 740 is connected to one end of the second variable resistor 730, and the source of the second NMOS transistor 745 is connected to one end of the third variable resistor 735. The other end of the second variable resistor 730 is connected to the other end of the third variable resistor 735 and a drain of the third NMOS transistor 750. The gate of the third NMOS transistor 750 is connected to a second bias voltage Vbias2, and the source of the third NMOS transistor 750 is connected to a low voltage Vss.

For each of the first, the second, and the third filters 565-1, 565-2, and 565-3, the first PMOS transistor 705, the second PMOS transistor 710, the first variable capacitor 720, the first variable resistor 725, the second variable resistor 730, the third variable resistor 735, the first NMOS transistor 740, the second NMOS transistor 745, and the third NMOS transistor 750 are integrated into one integrated circuit (IC). The first inductor 715 can be disposed either outside or inside the IC, depending on the processing variation of the inductor.

It is noted that, in this embodiment, each of the first, the second, and the third filters 565-1, 565-2, and 565-3 has the same structure, but the values of the first variable capacitor 720, the first variable resistor 725, the second variable resistor 730, and the third variable resistor 735 are different in the filters 565-1, 565-2, and 565-3. Similarly, the first inductor 715 may have a different inductance with respect to each filter, as as to adjust the gains, central frequencies, and bandwidths of the first, the second, and the third filters 565-1, 565-2, and 565-3.

For adjusting the gain of the adaptive filter 560, the values of the second and third variable resistors 730, 735 of the filters 565-1, 565-2, 565-3 are concurrently adjusted to become large, so as to make the entire gain of the adaptive filter 560 become small. Conversely, the entire gain of the adaptive filter 560 becomes large when the values are adjusted to become small.

For adjusting the central frequency of the adaptive filter 560 without changing the bandwidth, the first variable capacitors 720 of the filters 565-1, 565-2, 565-3 are concurrently adjusted so as to adjust the central frequency of the adaptive filter 560. Namely, when the first variable capacitors 720 of the filters 565-1, 565-2, 565-3 are adjusted to become small, the central frequency fc of the adaptive filter 560 shifts to a high frequency. Conversely, when the first variable capacitors 720 of the filters 1, 2, 3 are adjusted to become large, the central frequency fc of the adaptive filter 560 shifts to a low frequency.

For adjusting the bandwidth of the adaptive filter 560 without changing the central frequency, the first variable capacitors 720 of the second filter 565-2 is adjusted to become small in order to shift the central frequency fc2 of the second filter 565-2 to a high frequency, and the first variable capacitors 720 of the third filter 565-3 is adjusted to become large in order to shift the central frequency fc3 of the third filter 565-3 to a low frequency, thereby generating the entire effect of reducing the bandwidth of the adaptive filter 560 without changing the central frequency. Conversely, the first variable capacitors 720 of the second filter 565-2 is adjusted to become large in order to shift the central frequency fc2 of the second filter 565-2 to a low frequency, and the first variable capacitor 720 of the third filter 565-3 is adjusted to become small in order to shift the central frequency fc3 of the third filter 565-3 to a high frequency, thereby generating the entire effect of increasing the bandwidth of the adaptive filter 560 without changing the central frequency.

As shown in FIG. 9, since each of the filters 565-1, 565-2, and 565-3 is designed symmetrically, the second and the third variable resistors 730 and 735 have the same resistance.

The first, the second, and the third filters 565-1, 565-2, and 565-3 have a structure regarded as source degeneration. Accordingly, the gain of the first filter 565-1 is a resistance ratio of its first variable resistor 725 to second variable resistor 730, the gain of the second filter 565-2 is a resistance ratio of its first variable resistor 725 to second variable resistor 730, and the gain of the third filter 565-3 is a resistance ratio of its first variable resistor 725 to second variable resistor 730.

The bandwidth and central frequency of the first filter 565-1 is determined from the first inductor 715, the first variable capacitor 720, and the first variable resistor 725 of the first filter 565-1. The bandwidth and central frequency of the second filter 565-2 is determined from the first inductor 715, the first variable capacitor 720, and the first variable resistor 725 of the second filter 565-2. The bandwidth and central frequency of the third filter 565-3 is determined from the first inductor 715, the first variable capacitor 720, and the first variable resistor 725 of the third filter 565-3.

In each of the first filter 565-1, the second filter 565-2, and the third filter 565-3, the first variable capacitor 720 is a capacitor bank, and the first variable resistor 725, the second variable resistor 730, and the third variable resistor 735 are a resistor bank.

Figure 10:
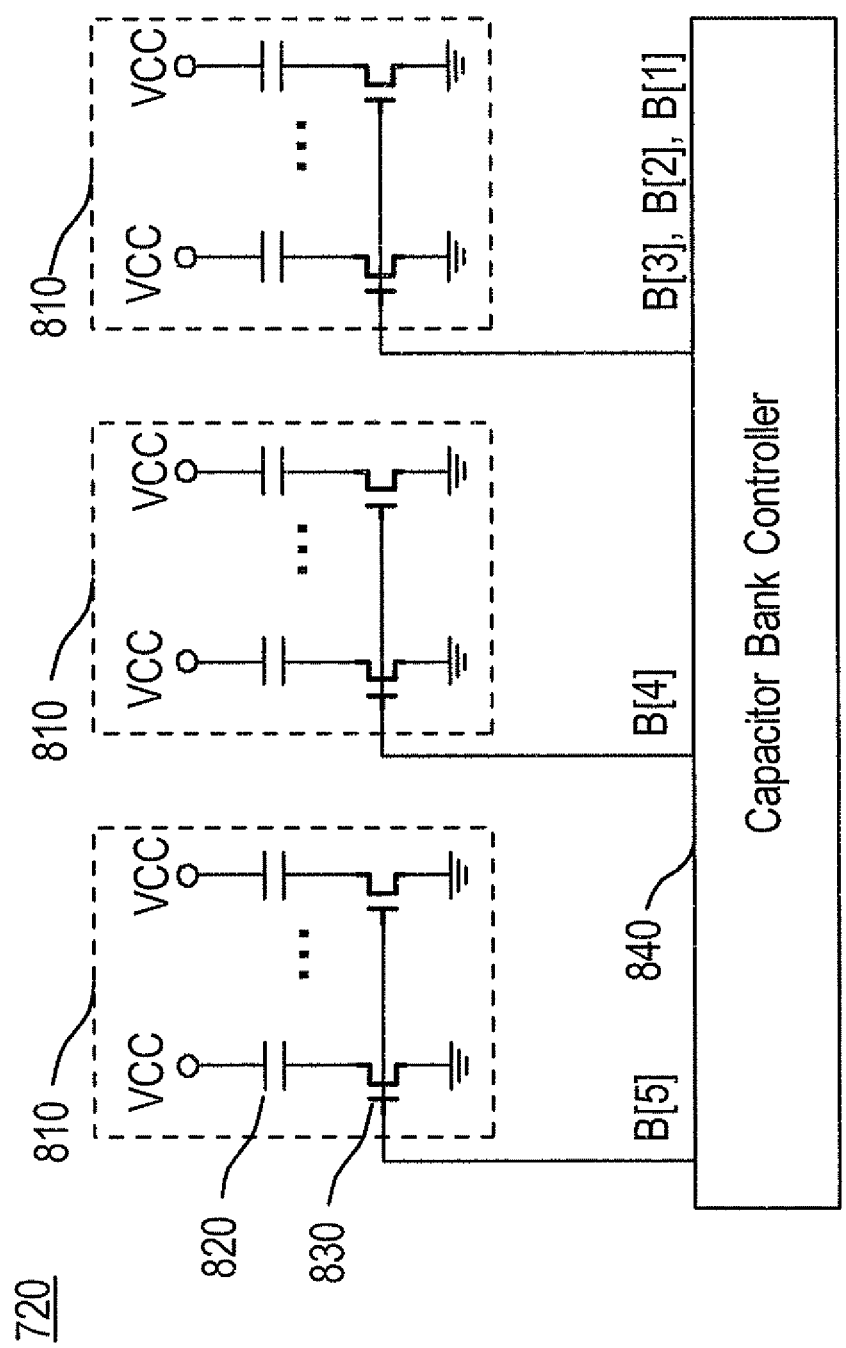
FIG. 10 is a circuit diagram of capacitor banks according to an embodiment of the invention.

FIG. 10 is a schematic view of a capacitor bank according to an embodiment of the invention. As shown in FIG. 10, the capacitor bank includes a plurality of capacitor selection devices 810 and a capacitor bank controller 840. Each capacitor selection device 810 has N capacitors 820 and N switches 830, where N is an integer greater than one.

The N switches 830 of each capacitor selection device 810 are each an NMOS transistor with a gate connected to the capacitor bank controller 840.

In this embodiment, the capacitors of each capacitor selection device 810 can be a base-emitter junction capacitor, a MOSFET capacitor, or a poly-poly capacitor. In other embodiments, the capacitors of each capacitor selection device 810 can be a metal-insulator-metal (MIM) capacitor.

As shown in FIG. 10, the capacitors of the capacitor bank 720 can be expressed as follows:

$$(C_{Paracitic}+B[1] \times C_{B1}+B[2] \times C_{B2}+B[3] \times C_{B3}+B[4] \times C_{B4}+B[5] \times C_{B5}),$$

where $C_{Paracitic}$ indicates a parasitic capacitor, $C_{B1}$, $C_{B2}$, $C_{B3}$, $C_{B4}$ and $C_{B5}$ are the capacitances of the capacitor selection devices 810, and B[1], B[2], B[3], B[4], or B[5], represented by B[i], indicates a control signal outputted from the capacitor bank controller 840 to the capacitor bank. $C_{B5}$ is the capacitance of the capacitor selection device 810 corresponding to the control signal B[5]. When B[i]=0, it indicates that the corresponding NMOS transistor is turned off, and the capacitor is at a floating state, without the capacitance effect. When B[i]=1, it indicates that the corresponding NMOS transistor is turned on, and the capacitor is grounded to generate the capacitance effect. The capacitor bank controller 840 can output a control signal to adjust the capacitance of the first variable capacitor 720. As shown in FIG. 10, the first, the second, and the third variable resistors 725, 730, and 735 can be operated in a similar manner.

Figure 11:
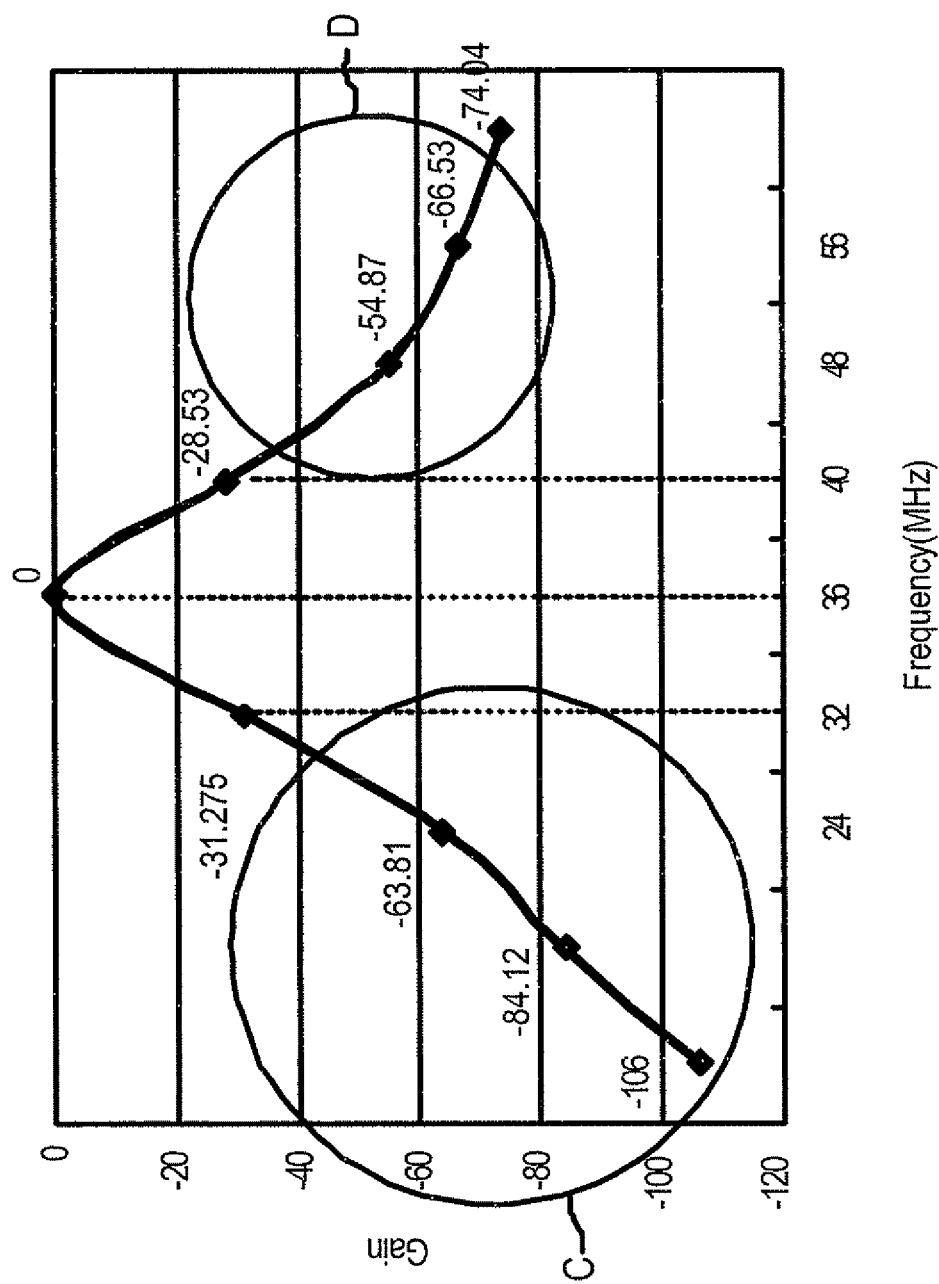
FIG. 11 schematically illustrates a spectrum simulation of an adaptive filter according to an embodiment of the invention.

FIG. 11 schematically illustrates a spectrum simulation of the adaptive filter 560 according to an embodiment of the invention. The adaptive filter 560 is comprised of three filters. The gain does not decrease at the stop band of the spectrum of a typical SAW filter, which has has noises with a higher amplitude at the stop band, resulting in interfering the receiving signal. By contrast, as shown in FIG. 11, the gains at the stop bands indicated by circles C, D in the invention remain in reduction, so as to prevent the receiving signal from being interfered by noises of the stop bands.

Figure 12:
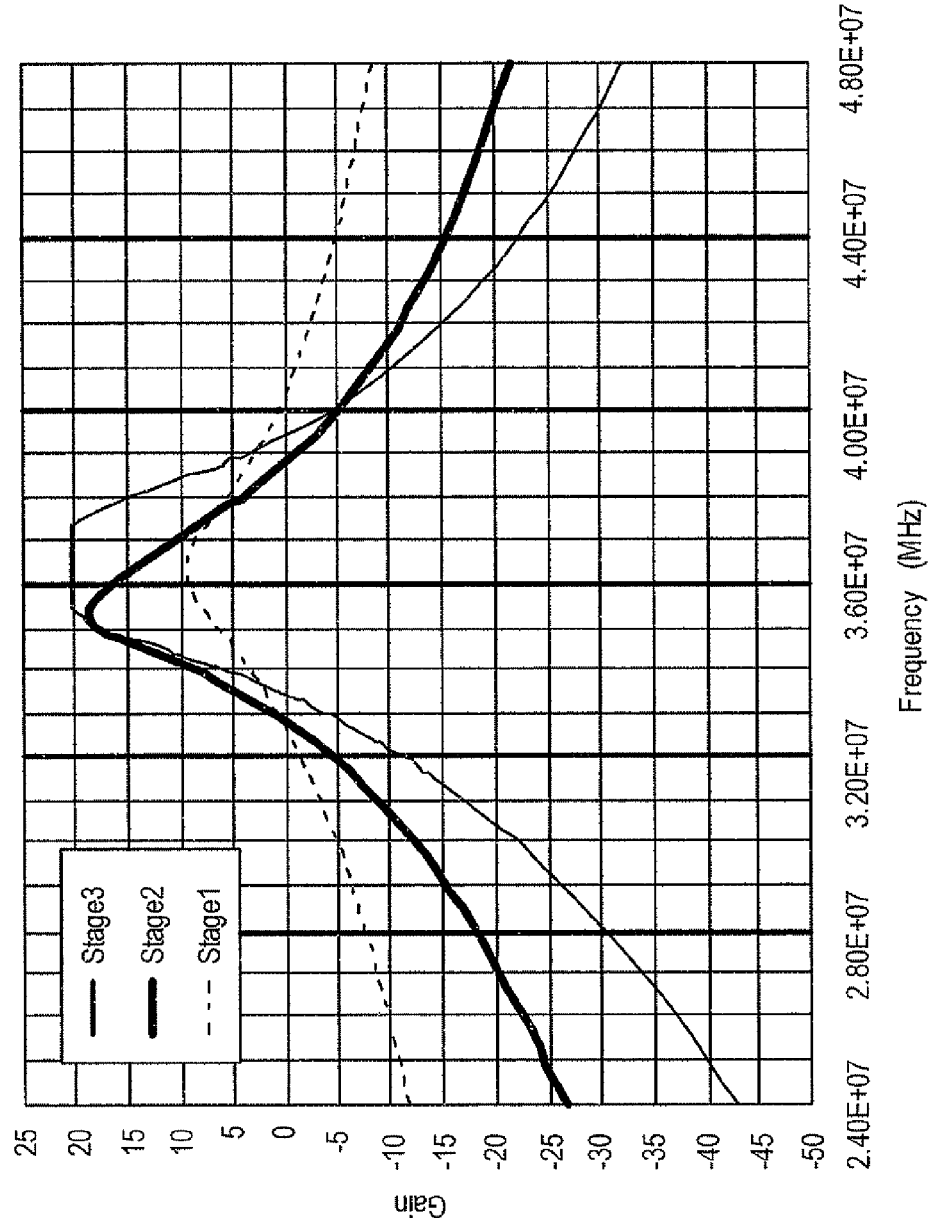
FIG. 12 schematically illustrates spectrums of the first, the second, and the third filters according to an embodiment of the invention.

FIG. 12 schematically illustrates spectrums of the first, second, and third filters according to an embodiment of the invention. As shown in FIG. 12, the spectrum of the first filter 565-1 is indicated by a dotted line and has a larger bandwidth, the spectrum of the first and the second filters 565-1, 565-2 is indicated by a bold line, and the spectrum of the first, the second, and the third filters 565-1, 565-2, 565-3 is indicated by a solid line. Since the gain of each filter can be adjusted, the adaptive filter 560 comprised of the first filter 565-1, the second filter 565-2, and the third filter 565-3 has a gain of 20 dB at the frequency of 36 MHz, a gain of −5 dB at the frequency of 40 MHz, and a gain of −12 dB at the frequency of 32 MHz.

Figure 13:
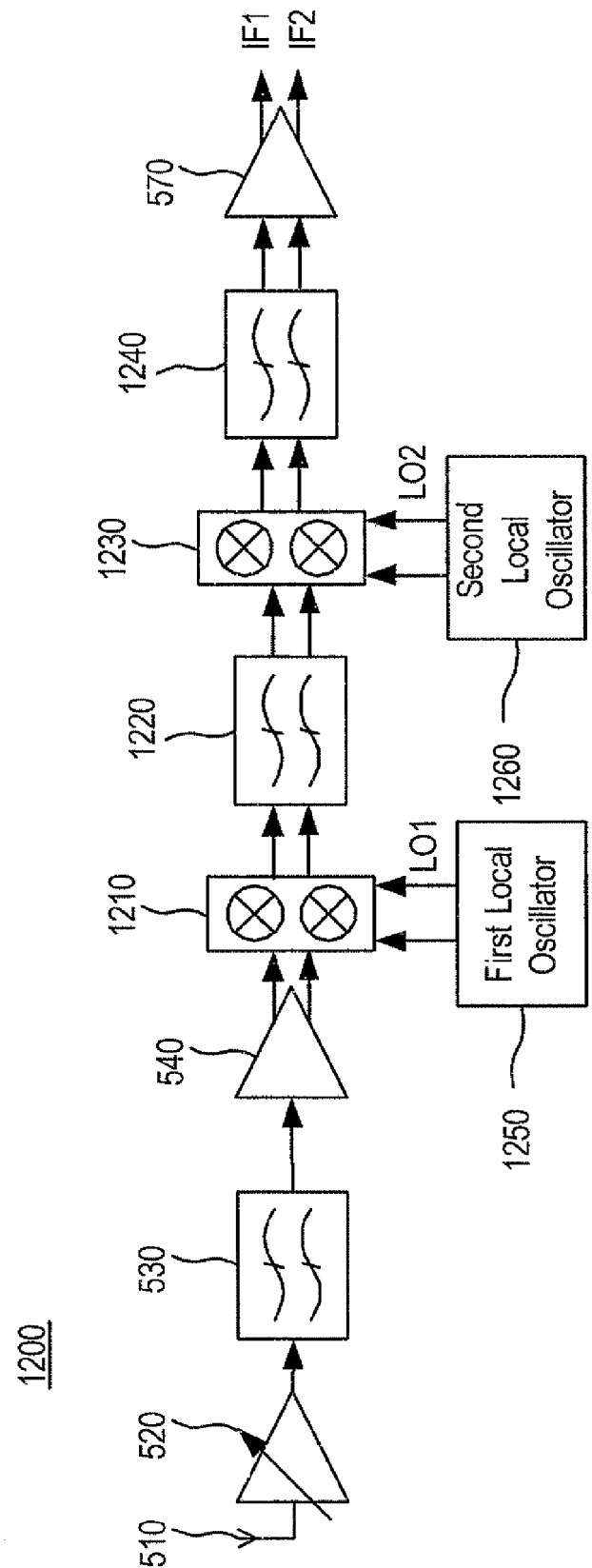
FIG. 13 is a block diagram of a general receiver device with adaptive filter according to another embodiment of the invention.

FIG. 13 is a block diagram of the general receiver device 1200 with adaptive filter according to another embodiment of the invention. In FIG. 13, a bi-IF conversion is performed so as to output two intermediate frequency signals. As shown in FIG. 13, the general receiver device 1200 includes an antenna 510, a bandpass tracking filter 530, a low noise amplifier 520, a single-ended-to-differential converter unit 540, a first mixer 1210, a first adaptive filter 1220, a second mixer 1230, a second adaptive filter 1240, a filtered intermediate frequency automatic gain control (IF AGC) amplifier 570, a first local oscillator 1250, and a second local oscillator 1260.

The antenna 510, the bandpass tracking filter 530, the low noise amplifier 520, the single-ended-to-differential converter unit 540, and the filtered IF AGC amplifier 570 are identical to those of FIG. 5, and thus a detailed description for them is deemed unnecessary.

The first mixer 1210 is connected to the single-ended-to-differential converter unit 540 in order to receive a first differential local oscillation signal for generating a first differential intermediate frequency (IF) signal. The first adaptive filter 1220 is connected to the first mixer 1210 in order to filter the first differential IF signal for generating a first filtered differential IF signal.

The second mixer 1230 is connected to the first adaptive filter 1220 in order to receive a second differential local oscillation signal for generating a second differential intermediate frequency (IF) signal. The second adaptive filter 1240 is connected to the second mixer 1230 in order to filter the second differential IF signal for generating a second filtered differential IF signal.

The first local oscillator 1250 is connected to the first mixer 1210 in order to generate the first differential local oscillation signal, and the second local oscillator 1260 is connected to the second mixer 1230 in order to generate the second differential local oscillation signal. Likewise, the configuration of FIG. 13 is able to achieve the same function as that in FIG. 5.

In view of the foregoing, it is known that the general receiver device with adaptive filter of the present invention has the advantages as follows:

1. There is no insertion loss, and the gain is adjustable with low noise.
2. The parameters of the adaptive filter are adjustable, wherein the parameters include: adjustable gain, adjustable bandwidth, and adjustable central frequency.
3. The adaptive filter can be integrated into a single chip easily and requires an area smaller than the Gm-C filter in the prior art.
4. The SAW filter can be eliminated, so as to reduce the cost.

Since the general receiver device in the invention uses the adaptive filter, it has the adjustable bandwidth, central frequency, and gain for meeting with various wireless receiver systems with different specifications, and can be integrated into a single chip. Therefore, a preferred cost-performance ratio is obtained in the invention.

Although the present invention has been explained in relation to its preferred embodiment, it is to be understood that many other possible modifications and variations can be made without departing from the spirit and scope of the invention as hereinafter claimed.

What is claimed is:

1. A general receiver device with adaptive filter, comprising:
    an antenna for receiving a radio frequency signal with a plurality of bands, each band having a plurality of channels;
    a low noise amplifier connected to the antenna for amplifying the radio frequency signal so as to generate an amplified radio frequency signal;
    a bandpass tracking filter connected to the low noise amplifier for filtering the amplified radio frequency signal so as to generate a filtered radio frequency signal;
    a single-ended-to-differential converter unit connected to the bandpass tracking filter for converting the filtered radio frequency signal into a differential radio frequency signal;
    a mixer connected to the single-ended-to-differential converter unit for receiving a differential local oscillation signal so as to generate a differential intermediate frequency signal;
    an adaptive filter connected to the mixer for filtering the differential intermediate frequency signal so as to generate a filtered differential intermediate frequency signal; and
    a filtered intermediate frequency automatic gain control amplifier connected to the adaptive filter for amplifying the filtered differential intermediate frequency signal so as to generate an amplified differential intermediate frequency signal.

2. The general receiver device with adaptive filter as claimed in claim 1, further comprising:
    a local oscillator connected to the mixer for generating the differential local oscillation signal.

3. The general receiver device with adaptive filter as claimed in claim 2, wherein the bandpass tracking filter is a band selective filter, the filtered radio frequency signal contains a plurality of channel signals of a specific band only, and a central frequency of the specific band is equal to that of the bandpass tracking filter.

4. The general receiver device with adaptive filter as claimed in claim 3, wherein the adaptive filter is a channel selective filter, and the filtered differential intermediate frequency signal is a required channel signal in the specific band.

5. The general receiver device with adaptive filter as claimed in claim 4, wherein the adaptive filter has a high input impedance.

6. The general receiver device with adaptive filter as claimed in claim 5, wherein the adaptive filter comprises:
    a first filter having a first quality factor for defining a bandwidth and central frequency of the adaptive filter;
    a second filter connected to the first filter and having a second quality factor for using spectrums of the first filter and the second filter to define a low bound frequency and sharpness of the bandwidth of the adaptive filter; and
    a third filter connected to the second filter and having a third quality factor for using spectrums of the first filter and the third filter to define an upper bound frequency and sharpness of the bandwidth of the adaptive filter,
    wherein the first quality factor has a value in a range of 5 to 15, and the second quality factor and the third quality factor each have a value over 15.

7. The general receiver device with adaptive filter as claimed in claim 6, wherein each of the first filter, the second filter, and the third filter is comprised of a first PMOS transistor, a second PMOS transistor, a first inductor, a first variable capacitor, a first variable resistor, a second variable resistor, a third variable resistor, a first NMOS transistor, a second NMOS transistor, and a third NMOS transistor.

8. The general receiver device with adaptive filter as claimed in claim 7, wherein for each of the first, the second, and the third filters, the first and the second PMOS transistors each have a source connected to a high voltage and a gate connected to a first bias voltage; the first PMOS transistor has a drain connected to one end of the first inductor, one end of the first variable capacitor, one end of the first variable resistor, and a drain of the first NMOS transistor; the second PMOS transistor has a drain connected to the other end of the first inductor, the other end of the first variable capacitor, the other end of the first variable resistor, and a drain of the second NMOS transistor; gates of the first and the second NMOS transistors receive a differential voltage; the first NMOS transistor has a source connected to one end of the second variable resistor; the second NMOS transistor has a source connected to one end of the third variable resistor; the second variable resistor has the other end connected to the other end of the third variable resistor and a drain of the third NMOS transistor; the third NMOS transistor has a gate connected to a second bias voltage and a source connected to a low voltage.

9. The general receiver device with adaptive filter as claimed in claim 8, wherein for each of the first, the second, and the third filters, the first PMOS transistor, the second PMOS transistor, the first variable capacitor, the first variable resistor, the second variable resistor, the third variable resistor, the first NMOS transistor, the second NMOS transistor, and the third NMOS transistor are integrated into an integrated circuit.

10. The general receiver device with adaptive filter as claimed in claim 9, wherein for each of the first, the second, and the third filters, the second and the third variable resistors have same resistance.

11. The general receiver device with adaptive filter as claimed in claim 10, wherein the first filter has a gain equal to a resistance ratio of the first variable resistor to second variable resistor, the second filter has a gain equal to a resistance ratio of the first variable resistor to second variable resistor, and the third filter has a gain equal to a resistance ratio of the first variable resistor to second variable resistor.

12. The general receiver device with adaptive filter as claimed in claim 11, wherein the bandwidth and central frequency of the first filter is determined from the first inductor, the first variable capacitor, and the first variable resistor of the first filter, the bandwidth and central frequency of the second filter is determined from the first inductor, the first variable capacitor, and the first variable resistor of the second filter, and the bandwidth and central frequency of the third filter is determined from the first inductor, the first variable capacitor, and the first variable resistor of the third filter.

13. The general receiver device with adaptive filter as claimed in claim 12, wherein the central frequency of the second filter is smaller than that of the first filter, and the central frequency of the first filter is smaller than that of the third filter.

14. A general receiver device with adaptive filter, comprising:
- an antenna for receiving a radio frequency signal with a plurality of bands, each band having a plurality of channels;
- a low noise amplifier connected to the antenna for amplifying the radio frequency signal so as to generate an amplified radio frequency signal;
- a bandpass tracking filter connected to the low noise amplifier for filtering the amplified radio frequency signal so as to generate a filtered radio frequency signal;
- a single-ended-to-differential converter unit connected to the bandpass tracking filter for converting the filtered radio frequency signal into a differential radio frequency signal;
- a first mixer connected to the single-ended-to-differential converter unit for receiving a first differential local oscillation signal so as to generate a first differential intermediate frequency signal;
- a first adaptive filter connected to the first mixer for filtering the first differential intermediate frequency signal so as to generate a first filtered differential intermediate frequency signal;
- a second mixer connected to the first adaptive filter for receiving a second differential local oscillation signal so as to generate a second differential intermediate frequency signal;
- a second adaptive filter connected to the second mixer for filtering the second differential intermediate frequency signal so as to generate a second filtered differential intermediate frequency signal;
- a filtered intermediate frequency automatic gain control amplifier connected to the second adaptive filter for amplifying the second filtered differential intermediate frequency signal so as to generate an amplified differential intermediate frequency signal.

15. The general receiver device with adaptive filter as claimed in claim 14, further comprising:
- a first local oscillator connected to the first mixer for generating the first differential local oscillation signal; and
- a second local oscillator connected to the second mixer for generating the second differential local oscillation signal.

* * * * *